March 29, 1927. 1,622,880
H. A. PERKINS
RADIAL BEARING
Filed Feb. 18, 1925 4 Sheets-Sheet 2
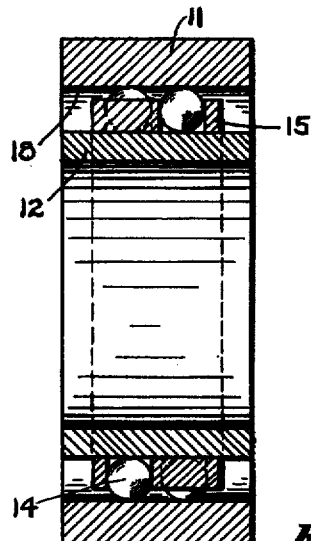
Fig 2
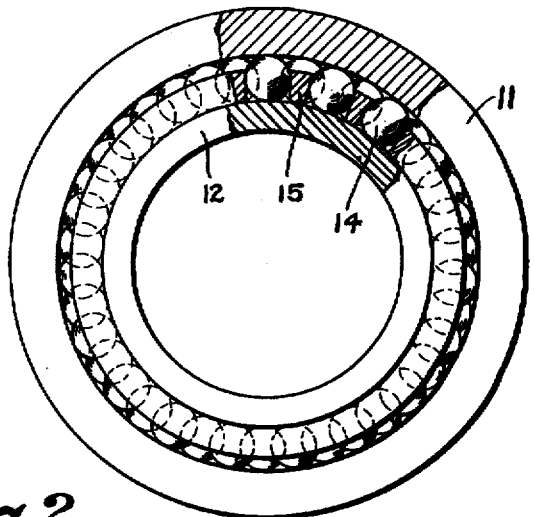
Fig 3
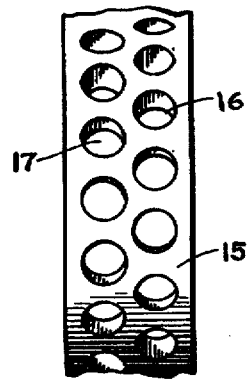
Fig 4
Fig 5
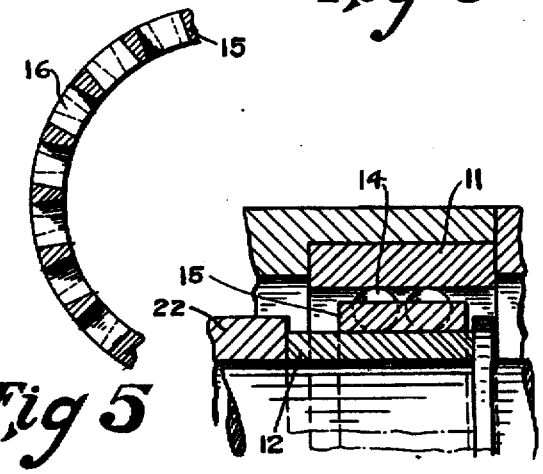
Fig 6
Hiram A. Perkins INVENTOR.
BY Harold E. Stonebraker
his ATTORNEY March 29, 1927. 1,622,880
H. A. PERKINS
RADIAL BEARING
Filed Feb. 18, 1925 4 Sheets-Sheet 4
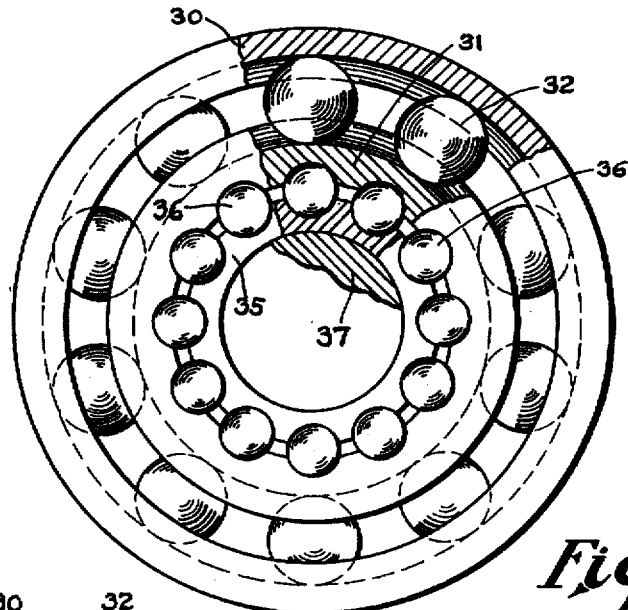
Fig 8
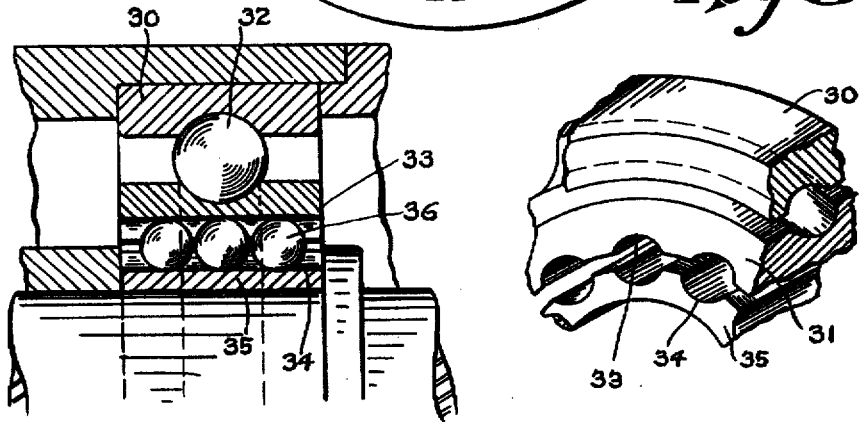
Fig 9
Fig 10

Patented Mar. 29, 1927.

1,622,880

UNITED STATES PATENT OFFICE.

HIRAM A. PERKINS, OF ROCHESTER, NEW YORK, ASSIGNOR TO AMERICAN WOODWORKING MACHINERY COMPANY, OF ROCHESTER, NEW YORK, A CORPORATION OF PENNSYLVANIA.

RADIAL BEARING.

Application filed February 18, 1925. Serial No. 10,059.

My invention relates to a radial bearing and has for its principal object to afford a construction employing a series of balls or other anti-friction members that will support a spindle, receiving radial thrust therefrom, and also permit endwise movement of the spindle.

In another aspect, the invention has for its purpose to provide a ball bearing for a spindle or similar unit, such that the balls can move in two directions at right angles to each other, as for instance, around the periphery of the spindle and also endwise of the spindle.

More particularly, the invention is intended to afford an efficient and practicable radial ball bearing for a spindle, having a slight reciprocating motion as in sand-papering machinery.

The invention also has for an object to provide a construction involving inner and outer ball engaging members forming a radial bearing, and arranged so that one of the said members, together with the balls, can move toward and from the sides of the other member.

With these and other ends in view, the invention comprises the construction and combination of parts that will appear clearly from the following description, when read in conjunction with the accompanying drawings, the novel features being pointed out in the claims following the description.

In the drawings:

Figure 2 is an enlarged transverse sectional view of the bearing illustrated in Figure 1;

Figure 3 is a side view of the same, partially in section;

Figure 4 is a plan view, partially broken away, of the ball retainer;

Figure 5 is a partial vertical sectional view of the ball retainer;

Figure 6 is an enlarged sectional view, with parts broken away, showing the application of the bearing to the spindle construction of Figure 1, with the spindle at the limit of its endwise movement;

Figure 8 is a side view, partially in section, of the bearing illustrated in Figure 7;

Figure 9 is an enlarged sectional view of a portion of Figure 7, and

Figure 10 is a detail perspective view, partially broken away and with the balls omitted, of the bearing illustrated in Figure 7 to 9 inclusive.

It has heretofore been impracticable to employ a radial ball bearing in connection with a reciprocating spindle, and one of the chief accomplishments of my invention is in gaining the advantages of a ball bearing in conjunction with a reciprocatory spindle, as well as the fact that I obtain a bearing in which the balls are permitted movement in two directions at right angles to each other, since this characteristic has possible points of advantage independently of the necessity of accommodating the bearing to a reciprocating unit. The specific disclosures herein set forth are intended only as illustrative examples of many possible applications of the invention, and it is further to be understood that while I have shown and described the bearing as including balls, this term is intended to include any anti-friction members such as rollers, where they may be substituted for the balls of the present embodiment.

Figure 1:
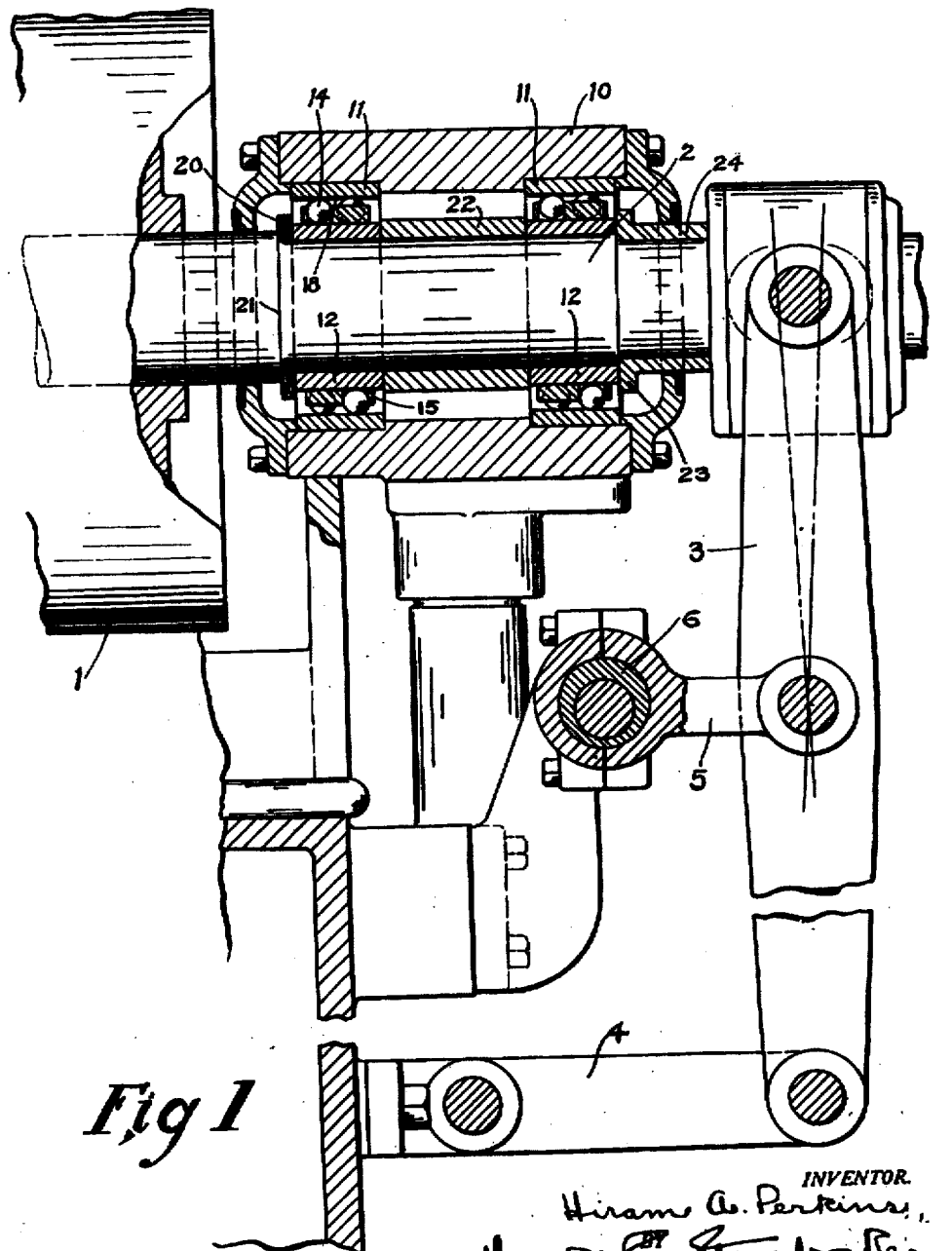
Figure 1 is a partial sectional view showing the application of my invention to a sand-papering machine for finishing surfaces of wood.
Figure 7:
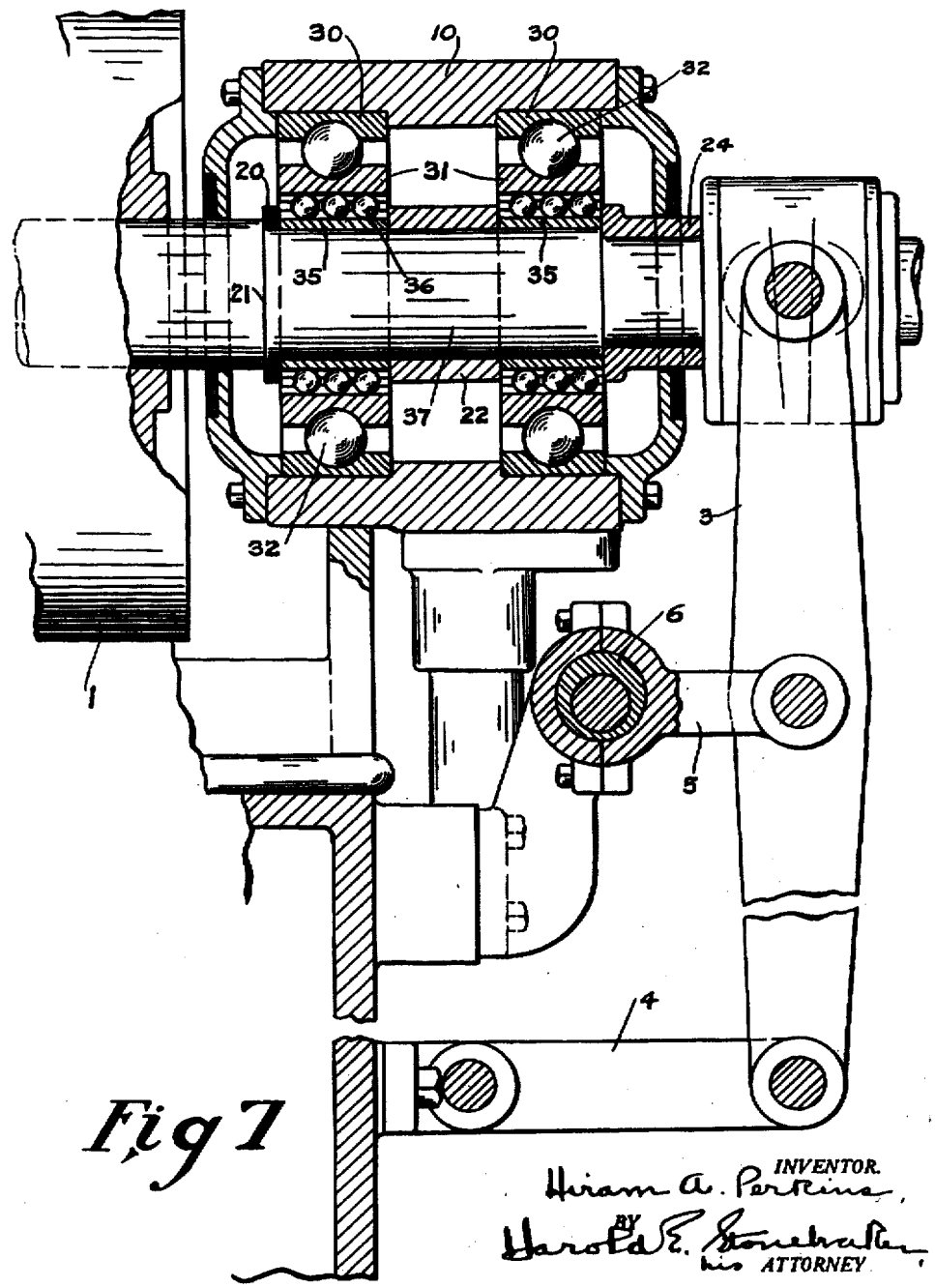
Figure 7 is a sectional view of a modified form of the bearing, applied to a machine similar to that of Figure 1.

Figures 1 to 6 illustrate a form of bearing embodying my invention in which the balls and ball retainer are movable in a direction at right angles to the radial thrust, or toward and from the sides of one of the ball engaging members, such an arrangement being advantageous when applied to a reciprocating spindle structure, such as shown in Figure 1. This view illustrates a portion of a sand-papering machine, including a sand-papering roll 1 mounted on a reciprocating spindle 2 that is operated from a rock arm 3 pivoted upon the bracket 4, the rock arm 3 being actuated by link 5 and eccentric 6. In machines of this particular character, ball bearing mountings for the spindle have not been used owing to the reciprocating motion of the spindle, but with the present arrangement, is is possible for the spindle to have the necessary longitudinal motion and still maintain proper and effective relation with the balls of the bearing.

The bearings are mounted in a box 10 and comprise the stationary outer ball engaging members 11 and inner ball engaging members 12 which are fixed to the spindle 2 and rotate therewith. Arranged between the inner and outer ball engaging members are the balls 14 held by the retainers 15. The arrangement shown includes a retainer for two sets of balls arranged in openings 16 and 17 which are in staggered relation with each other, but my invention may be carried out with a single series of balls or any number of series thereof.

The balls 14 and retainer 15 are floatingly arranged between the inner and outer ball engaging members 11 and 12, to permit their movement toward and from the sides of the outer members 11, and to this end the ball engaging members 11 and 12 are provided with straight, parallel ball engaging surfaces 18. The inner member 12 being fixed to the spindle 2 reciprocates with it, causing a resulting rolling movement of the balls 14 endwise of the spindle simultaneously with their rolling movement around the spindle. Thus the balls 14 have a movement in two directions at right angles to each other, produced by the rotating and reciprocating movements of the spindle. Ordinarily, the floating movement of the ball retainer endwise of the spindle will not carry the balls beyond the sides of the stationary member 11, and to prevent any such excessive movement I preferably employ positive limiting means of the following nature.

20 is a collar held on the spindle between the flange 21 and the inner bearing member 12. The collar 20 extends outwardly beyond the periphery of the bearing member 12, as shown in Figure 1, and constitutes a stop preventing any movement of the balls and retainer beyond the collar 20. The bearing members 12 are held in their respective positions by a spacing sleeve 22 which is of greater outside diameter than the members 12, thereby affording limiting means preventing movement of the ball retainers beyond the sides of the sleeve 22, while outward movement of the outermost retainer is limited by a flange 23 on sleeve 24. The entire assembly just described, including collar 20, sleeves 22, and 24, and ball engaging members 12 are held in fixed relation upon the spindle 2 by suitable clamping means that forces all of said parts tightly toward the flange 21 on the spindle.

As the spindle reciprocates, due to the operation of eccentric 6, the ball engaging members 12 move therewith, and cause the balls 14 to roll upon the fixed ball engaging members 11 in a direction endwise of the spindle, while during such endwise movement the balls are rolled around the spindle as a result of its rotating movement. Thus a double movement of the balls and retainers is continually taking place while these parts, although partaking of a slight endwise movement, occupy and retain a position near the center of the ball engaging members, as shown in Figures 1 and 6.

Figures 7 to 10 inclusive disclose a modified arrangement wherein one group of balls function to roll around the spindle, due to its rotative action, while another group function to move endwise of the spindle, permitting its reciprocating travel. This is accomplished in the following manner.

30 and 31 designate outer and inner ball engaging members provided with annular raceways to receive the balls 32, which, together with the inner members 31, partake of a rolling motion around the spindle, as usual in radial ball bearing structures.

The inner ball engaging members 31 are provided with a series of transverse grooves 33 on their inner peripheries which cooperate with corresponding grooves 34 on the ball engaging members 35 to afford longitudinal raceways for the balls 36. The ball engaging members 35 are fixed upon the spindle 37, and since the balls 36 are located in grooves arranged transversely of the members 31 and 35, these parts all move together during rotation of the spindle 37, that is to say, the bearing members 31 and 35 and balls 36 turn with the spindle 37, while the balls 32 roll between the rotating member 31 and the fixed ball engaging member 30.

The balls 36 function to permit the necessary longitudinal or endwise travel of the spindle 37 when it reciprocates, such movement causing a rolling of the balls 36 endwise of the spindle between the members 35 which are fixed on the spindle and the members 31 which are held against longitudinal movement with the spindle by the balls 32. Thus there is a constant proper functioning of the balls 32 while permitting endwise travel of the spindle. Such endwise travel is not great, but it is desirable to prevent excessive endwise movement of the balls with reference to the engaging members 31, and this is accomplished by limiting or stop devices similar in arrangement to those described in Figure 1.

The invention is applicable to any spindle or other rotating unit, irrespective of whether it be arranged vertically, horizontally or otherwise, and various changes and modifications are possible without departing from the underlying characteristics of the invention or the essential features of my improvement. This application is intended to cover any other arrangements or modifications than those herein specifically shown, as long as they come within the general purview of the invention or the scope of the following claims.

I claim:

1. The combination with a rotary spindle and means for reciprocating the same intermittently, of a series of balls, and inner and outer ball engaging members having straight surfaces permitting movement of the balls endwise of the spindle as it reciprocates.

2. The combination with a rotary spindle and means for reciprocating the same intermittently, of a series of balls surrounding and supporting the spindle, and means housing the balls permitting movement thereof endwise of the spindle as the latter reciprocates.

3. The combination with a rotary spindle and means for reciprocating the same intermittently, of inner ball engaging members fixed to the spindle, stationary outer ball engaging members, balls arranged between the inner and outer engaging members having straight surfaces permitting movement of the balls endwise of the spindle as the latter reciprocates, a spacing member fixed to the spindle between the inner engaging members and of slightly greater outside diameter than the same to afford shoulders limiting endwise movement of the balls, and shoulders arranged on the spindle at the opposite ends of the inner ball engaging members to limit longitudinal movement of the balls in the other direction.

4. The combination with a rotary spindle and means for reciprocating the same intermittently, of inner ball engaging members fixed to the spindle, stationary outer ball engaging members, balls arranged between said members for supporting the spindle, and floating ball races for the balls, said engaging members having straight parallel surfaces permitting movement of the balls and races endwise of the spindle as the latter reciprocates.

5. The combination with a rotary spindle and means for reciprocating the same intermittently, of inner ball engaging members fixed to the spindle, outer ball engaging members, and balls arranged circularly between said members, the latter having straight parallel ball engaging surfaces permitting movement of the balls endwise of the spindle as the latter reciprocates.

In witness whereof, I have hereunto signed my name.

HIRAM A. PERKINS.

outer ball engaging members having straight surfaces permitting movement of the balls endwise of the spindle as it reciprocates.

2. The combination with a rotary spindle and means for reciprocating the same intermittently, of a series of balls surrounding and supporting the spindle, and means housing the balls permitting movement thereof endwise of the spindle as the latter reciprocates.

3. The combination with a rotary spindle and means for reciprocating the same intermittently, of inner ball engaging members fixed to the spindle, stationary outer ball engaging members, balls arranged between the inner and outer engaging members having straight surfaces permitting movement of the balls endwise of the spindle as the latter reciprocates, a spacing member fixed to the spindle between the inner engaging members and of slightly greater outside diameter than the same to afford shoulders limiting endwise movement of the balls, and shoulders arranged on the spindle at the opposite ends of the inner ball engaging members to limit longitudinal movement of the balls in the other direction.

4. The combination with a rotary spindle and means for reciprocating the same intermittently, of inner ball engaging members fixed to the spindle, stationary outer ball engaging members, balls arranged between said members for supporting the spindle, and floating ball races for the balls, said engaging members having straight parallel surfaces permitting movement of the balls and races endwise of the spindle as the latter reciprocates.

5. The combination with a rotary spindle and means for reciprocating the same intermittently, of inner ball engaging members fixed to the spindle, outer ball engaging members, and balls arranged circularly between said members, the latter having straight parallel ball engaging surfaces permitting movement of the balls endwise of the spindle as the latter reciprocates.

In witness whereof, I have hereunto signed my name.

HIRAM A. PERKINS.

CERTIFICATE OF CORRECTION.

Patent No. 1,622,880.

Granted March 29, 1927, to

HIRAM A. PERKINS.

It is hereby certified that the above numbered patent was erroneously issued to "American Woodworking Machinery Company, of Rochester, New York, a corporation of Pennsylvania", whereas said Letters Patent should have been issued to "Yates-American Machine Company, of Rochester, New York, a corporation of Delaware", said corporation being assignee, by mesne assignments, of the entire interest in said invention, as shown by the records of assignments in this office; and that the said Letters Patent should be read with this correction therein that the same may conform to the record of the case in the Patent Office.

Signed and sealed this 19th day of April, A. D. 1927.

M. J. Moore,
Acting Commissioner of Patents.

Seal.

CERTIFICATE OF CORRECTION.

Patent No. 1,622,880.             Granted March 29, 1927, to

HIRAM A. PERKINS.

It is hereby certified that the above numbered patent was erroneously issued to "American Woodworking Machinery Company, of Rochester, New York, a corporation of Pennsylvania", whereas said Letters Patent should have been issued to "Yates-American Machine Company, of Rochester, New York, a corporation of Delaware", said corporation being assignee, by mesne assignments, of the entire interest in said invention, as shown by the records of assignments in this office; and that the said Letters Patent should be read with this correction therein that the same may conform to the record of the case in the Patent Office.

Signed and sealed this 19th day of April, A. D. 1927.

M. J. Moore,
Seal.                                   Acting Commissioner of Patents.